UNITED STATES PATENT OFFICE.

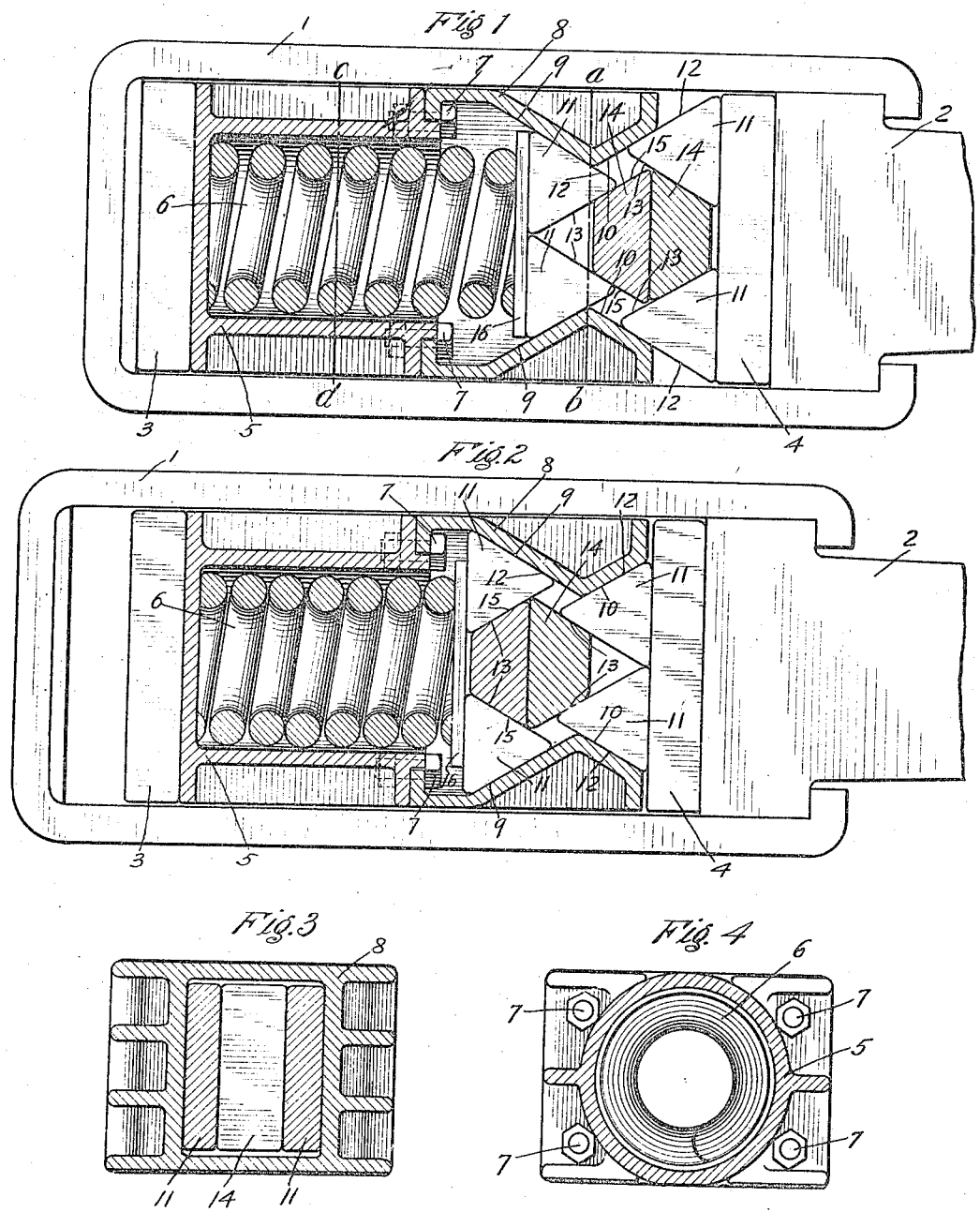

EDWARD W. NEWELL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FRICTION DRAFT-GEAR.

1,165,622.    Specification of Letters Patent.    Patented Dec. 28, 1915.

Application filed February 24, 1914. Serial No. 820,470.

*To all whom it may concern:*

Be it known that I, EDWARD W. NEWELL, a citizen of the United States, residing at Pittsburgh, in the county of Allegheny and State of Pennsylvania, have invented new and useful Improvements in Friction Draft-Gear, of which the following is a specification.

This invention relates to friction draft gear of the type employed on railway cars for absorbing and dissipating shocks due to draft and buffing stresses.

One object of my invention is to provide a friction draft gear which is compact and can be manufactured at a low cost.

Another object is to provide an improved friction draft gear having a large area of friction surface in a confined space.

Other objects and advantages will be apparent in the following more detailed description of the invention.

In the accompanying drawing; Figure 1 is vertical section of a friction draft gear embodying my improvements and showing the parts in normal position; Fig. 2 a similar view, showing the parts in the positions assumed under a buffing stress; Fig. 3 a transverse section on the line *a—b* of Fig. 1; and Fig. 4 a transverse section on the line *c—d* of Fig. 1.

As shown in the drawing, the construction comprises the usual yoke 1 connected to the draw-bar 2 and surrounding the friction daft gear elements. Within the yoke 1 are the usual follower plates 3 and 4 and arranged to engage the rear follower plate 3 is a casing 5 having a centrally located cylindrical chamber containing a draft spring 6. Secured to the casing 5 by bolts 7 is a casting 8 for inclosing the friction blocks of the draft gear, and said casting is provided with pairs of oppositely inclined friction faces 9 and 10 arranged on opposite sides of the longitudinal axis of the gear, said faces converging inwardly to a common axis. Wedge blocks 11 are mounted in the gear on opposite sides of the longitudinal axis of the gear and each block is provided with oppositely inclined friction faces 12 and 13, the outer faces 12 engaging the friction faces 9 of the casting 8. A similar pair of wedge blocks 11 are mounted in the gear and are arranged to have the friction faces 12—12 engage the corresponding friction faces 10—10 of the casting 8. A floating friction element is mounted in the space formed interiorly of the wedge blocks 11 and preferably comprises two wedge blocks 14—14 placed back to back and each provided with oppositely inclined friction faces 15 adapted to engage corresponding friction faces 13 of the blocks 11.

The floating friction element is made of two members so as to allow for adjustment of the parts in case the parts are inaccurately made or are out of alinement. Otherwise said element could be made in one piece. The front wedge blocks 11—11 have their lateral faces engaging the front follower 4. A bearing plate 16 may be interposed between the inner end of the draft spring 6 and the lateral faces of the rear wedge blocks 11—11.

In operation, if a buffing stress is applied to the draw-bar 2, the front follower plate 4 is forced rearwardly, causing the front wedge blocks to move rearwardly and inwardly toward the longitudinal axis of the gear by the engagement of the friction faces 12 with the friction faces 10 of the casting 8. This action narrows the space between the opposite front wedge blocks 11—11 and thus forces the wedge blocks 14—14 rearwardly, so that the rear floating block 14 acts on the rear wedge blocks 11—11 to force the same rearwardly against the resistance of the draft spring 6, the spring 6 being held at the rear end by the casing 5 engaging the rear follower plate 3, which is held stationary in this movement by the usual stops. In release, the pressure is relieved on the front follower 4 and this permits the draft spring to force the wedge blocks back to normal position.

Under draft stresses the action is quite similar except that the movements are in the reverse direction and the stress is applied through the rear follower plate 3 to the draft spring 6 and thence to the friction elements.

It will now be seen that in action, the inclined friction faces of all the wedge blocks are effective to produce friction as well as the lateral faces of the wedge blocks 11.

It will also be noted that the construction is simple and that the friction elements are arranged in a compact form.

Having now described my invention, what I claim as new and desire to secure by Letters Patent, is:—

1. In a friction draft gear, the combination with a draw-bar, of opposite pairs of wedge blocks each having oppositely inclined friction faces converging at the proximate ends and thereby forming a central inclosure, a floating friction element mounted in said inclosure and provided with oppositely inclined friction faces adapted to engage the inclosing friction faces of the wedge blocks, an integral casing inclosing the wedge blocks and having oppositely inclined friction faces for engaging corresponding outer friction faces of the wedge blocks, and a spring for opposing the movement of the wedge blocks.

2. In a friction draft gear, the combination with a draw-bar, a yoke secured to the draw-bar, and follower plates mounted within the yoke at opposite ends, a pair of wedge blocks on opposite sides of the longitudinal axis of the gear, each wedge block having oppositely inclined friction faces and each pair of wedge blocks having the friction faces converging at the proximate ends so that the inner friction faces of the wedge blocks form an inclosure, a floating friction element mounted within the inclosure and provided with oppositely inclined friction faces adapted to engage the inner friction faces of the wedge blocks, the wedge blocks being movable in one direction by direct engagement with one follower plate, and a draft spring interposed between the other follower plate and the wedge blocks.

3. In a friction draft gear, the combination with a draw-bar, a yoke secured to the draw-bar, and follower plates mounted within the yoke at opposite ends, a pair of wedge blocks on opposite sides of the longitudinal axis of the gear, each wedge block having oppositely inclined friction faces and each pair of wedge blocks having the friction faces converging at the proximate ends so that the inner friction faces of the wedge blocks form an inclosure, a floating friction element mounted within the inclosure and provided with oppositely inclined friction faces adapted to engage the inner friction faces of the wedge blocks, an inclosing friction member having oppositely inclined friction faces for engaging the outer friction faces of the wedge blocks, the wedge blocks at one end being in direct engagement with one follower plate, and a draft spring interposed between the other follower plate and the wedge blocks at the other end.

4. The combination with a draft spring, of a casing containing said spring, a pair of laterally disposed wedge blocks mounted at one end of the spring, each wedge block having oppositely inclined friction faces converging outwardly from the spring, an inclosing friction member secured to said casing and provided with friction faces for engaging the outer friction faces of said wedge blocks, a second pair of laterally disposed wedge blocks having oppositely inclined friction faces converging toward the draft spring and having the outer friction faces thereof in engagement with friction faces on said friction member, and a floating friction element provided with opposingly inclined friction faces for engaging the inner friction faces of the wedge blocks.

In testimony whereof I have hereunto set my hand.

EDWARD W. NEWELL.

Witnesses:
A. M. CLEMENTS,
S. W. KEEFER.